(12) United States Patent
White

(10) Patent No.: US 10,086,942 B2
(45) Date of Patent: Oct. 2, 2018

(54) AIRCRAFT STORES TRANSPORT SYSTEM

(71) Applicant: BAE Systems plc, London (GB)

(72) Inventor: Andrew Charles White, Preston Lancashire (GB)

(73) Assignee: BAE SYSTEMS PLC, London (GB)

(*) Notice: Subject to any disclaimer, the term of this patent is extended or adjusted under 35 U.S.C. 154(b) by 0 days.

(21) Appl. No.: 15/736,880

(22) PCT Filed: Jun. 21, 2016

(86) PCT No.: PCT/GB2016/051854
§ 371 (c)(1),
(2) Date: Dec. 15, 2017

(87) PCT Pub. No.: WO2016/207622
PCT Pub. Date: Dec. 29, 2016

(65) Prior Publication Data
US 2018/0170542 A1 Jun. 21, 2018

(30) Foreign Application Priority Data
Jun. 22, 2015 (EP) .................................... 15250013
Jun. 22, 2015 (GB) .................................... 1510951.5

(51) Int. Cl.
*B64D 1/12* (2006.01)
*B64D 1/10* (2006.01)
(Continued)

(52) U.S. Cl.
CPC ................. *B64D 1/10* (2013.01); *B64D 7/00* (2013.01); *F41H 3/00* (2013.01); *H01Q 17/008* (2013.01)

(58) Field of Classification Search
CPC ... B64D 1/00; B64D 1/02; B64D 1/04; B64D 1/06; B64D 1/08; B64D 1/10; B64D 1/12
See application file for complete search history.

(56) References Cited

U.S. PATENT DOCUMENTS

| 2,802,396 A | 8/1957 | Montgomery |
| 2,949,094 A | 8/1960 | Clothier |

(Continued)

FOREIGN PATENT DOCUMENTS

| DE | 2822355 A1 | 12/1984 |
| EP | 1375345 A1 | 1/2004 |

(Continued)

OTHER PUBLICATIONS

International Search Report and Written Opinion of International Application No. PCT/GB2016/051855, dated Sep. 19, 2016, 10 pages.

(Continued)

*Primary Examiner* — Richard G Davis
(74) *Attorney, Agent, or Firm* — Maine Cernota & Rardin

(57) ABSTRACT

A system comprising: a low observable aircraft (2) having its external surfaces oriented at a limited number of directions; a device (12) mounted to the aircraft (2) outside the external surfaces of the aircraft (2); and a fairing (10) located outside the external surfaces of the aircraft (2), the fairing (10) being releasably coupled to the one or more external surfaces of the aircraft (2), at least part of the fairing (10) being spaced apart from one or more of the external surfaces of the aircraft (2) so as to define a chamber between the fairing (10) and that one or more external surfaces of the aircraft (2). The device (12) is wholly located within the chamber. One or more external surfaces of the fairing (10) are oriented in the same direction as at least one external surface of the aircraft (2).

14 Claims, 2 Drawing Sheets

(51) Int. Cl.
*H01Q 17/00* (2006.01)
*F41H 3/00* (2006.01)
*B64D 7/00* (2006.01)

(56) References Cited

U.S. PATENT DOCUMENTS

| 4,489,638 | A | 12/1984 | Bastian et al. |
| 5,222,996 | A | 6/1993 | Marshall et al. |
| 8,276,305 | B1 | 10/2012 | Leutenegger et al. |
| 2008/0099622 | A1* | 5/2008 | Yoffe ............... B64D 7/00 244/137.4 |
| 2013/0221158 | A1 | 8/2013 | Binkholder et al. |

FOREIGN PATENT DOCUMENTS

| EP | 2532588 | A1 | 12/2012 |
| GB | 214685 | A | 5/1924 |
| GB | 2025009 | A | 1/1980 |
| GB | 2124570 | A | 2/1984 |
| GB | 2499897 | A | 9/2013 |
| WO | 2015034557 | A1 | 3/2015 |
| WO | 2015145426 | A1 | 10/2015 |

OTHER PUBLICATIONS

Search Report under Section 17(5) of Great Britain Application No. GB1510953.1, dated Dec. 10, 2015, 3 pages.
European Search Report of European Application No. EP15250014.6, dated Dec. 1, 2015, 7 pages.
International Search Report and Written Opinion of International Application No. PCT/GB2016/051854, dated Sep. 20, 2016, 11 pages.
Search Report under Section 17(5) of Great Britain Application No. GB1510951.5, dated Dec. 10, 2015, 5 pages.
European Search Report of European Application No. EP15250013.8, dated Nov. 27, 2015, 7 pages.
International Preliminary Report on Patentability of International Application No. PCT/GB2016/051854, dated Dec. 26, 2017, 7 pages.
International Preliminary Report on Patentability of International Application No. PCT/GB2016/051855, dated Dec. 26, 2017, 7 pages.

* cited by examiner

AIRCRAFT STORES TRANSPORT SYSTEM

RELATED APPLICATIONS

This application is a national phase application filed under 35 USC § 371 of PCT Application No. PCT/GB2016/051854 with an International filing date of Jun. 21, 2016 which claims priority of GB Patent Application 1510951.5 filed Jun. 22, 2015 and EP Patent Application 15250013.8 filed Jun. 22, 2015. Each of these applications is herein incorporated by reference in its entirety for all purposes.

FIELD OF THE INVENTION

The present invention relates to the carrying of aircraft stores by aircraft.

BACKGROUND

Planform alignment is used in the design of many stealth, or "Low Observable" (LO) (i.e. low detectability by radar systems), aircraft. Planform alignment involves using a small number of surface orientations in the shape of the structure of the aircraft. For example, leading and trailing edges of the aircraft wing, tail surfaces of the aircraft, and surface of other aircraft structures (such as intakes and apertures) may be set to be the same angle. This is done to so that the aircraft reflects radar signals that are detectable only in very specific directions relative to the aircraft, rather than returning a radar signal that may be detected at many different angles.

LO aircraft may be used to carry payloads. Payloads tend to be carried by LO aircraft in internal storage bays. This tends to reduce the radar signature of the payload and maintain the low radar visibility properties of the aircraft.

Deployment of payloads by LO aircraft commonly involves the opening and closing of powered doors on an underside of the aircraft. Such opening and closing of powered doors may be performed while the aircraft is travelling at high speeds.

SUMMARY OF THE INVENTION

In a first aspect, the present invention provides a system comprising: a low observable aircraft having its edges oriented at a limited number of directions designed in accordance with planform alignment; a device mounted to the aircraft outside external surfaces of the aircraft; and a fairing located outside the external surfaces of the aircraft, the fairing being releasably coupled to the one or more external surfaces of the aircraft, at least part of the fairing being spaced apart from one or more of the external surfaces of the aircraft so as to define a chamber between the fairing and that one or more external surfaces of the aircraft. The device is wholly located within the chamber. The fairing is configured such that one or more interfaces between the fairing and the aircraft are substantially conformal and are oriented in the same direction as at least one edge of the aircraft in accordance with the principals of planform alignment.

Each of the external surfaces of the fairing may be oriented in the same direction as at least one external surface of the aircraft.

The chamber may be a closed chamber.

The system may further comprise a sealant located at an interface between the fairing and one or more external surfaces of the aircraft, the sealant being non-electrically conductive.

The system may further comprise a fairing detachment system operable to detach the fairing from the aircraft.

The fairing detachment system may comprise a hinge between the fairing and the aircraft, the hinge being configured to permit rotation of the fairing with respect to the aircraft, and to permit free movement of the fairing away from the aircraft when the fairing is at a predefined angle with respect to the aircraft.

The system may further comprise a propulsion system configured to propel the fairing away from the aircraft. The propulsion system may be a cold gas propulsion system.

The aircraft may comprise a fairing retaining device for retaining the fairing against one or more external surfaces of the aircraft. The aircraft may comprise a first retraction device configured to, after release of the fairing from the aircraft, retract the fairing retaining device into the aircraft such that the fairing retaining device is within the external surfaces of the aircraft.

The aircraft may further comprise means for sealing an opening through which the fairing retaining device is retracted into the aircraft.

The aircraft may comprise a mounting device for releasably mounting the device to the aircraft and operable to detach the device from the aircraft. The aircraft may comprise a second retraction device configured to, after release of the device from the aircraft, retract the mounting device into the aircraft such that the mounting device is within the external surfaces of the aircraft.

The aircraft may further comprise means for sealing an opening through which the mounting device is retracted into the aircraft.

The fairing may comprise means for fragmenting or destroying (e.g. combusting) the fairing after separation of the fairing from the aircraft.

The fairing may be at least partially made of a material selected from a group of materials consisting of: a radar absorbent material, a degradable material, a biodegradable material, and a material that is dissolvable in water.

The device may be a device selected from the group of devices consisting of: a missile, a rocket, a bomb, a pyrotechnic device, and a sonobuoy.

In a further aspect, the present invention provides a method of providing a system. The method comprises: providing a low observable aircraft having its edges oriented at a limited number of directions designed in accordance with planform alignment; mounting a device to the aircraft outside external surfaces of the aircraft; and releasably coupling a fairing to the aircraft outside the external surfaces of the aircraft such that: at least part of the fairing is spaced apart from one or more of the external surfaces of the aircraft so as to define a chamber between the fairing and that one or more external surfaces of the aircraft; the device is wholly located within the chamber; and the fairing is configured such that one or more interfaces between the fairing and the aircraft are substantially conformal and are oriented in the same direction as at least one edge of the aircraft in accordance with the principals of planform alignment.

DETAILED DESCRIPTION

Figure 1:
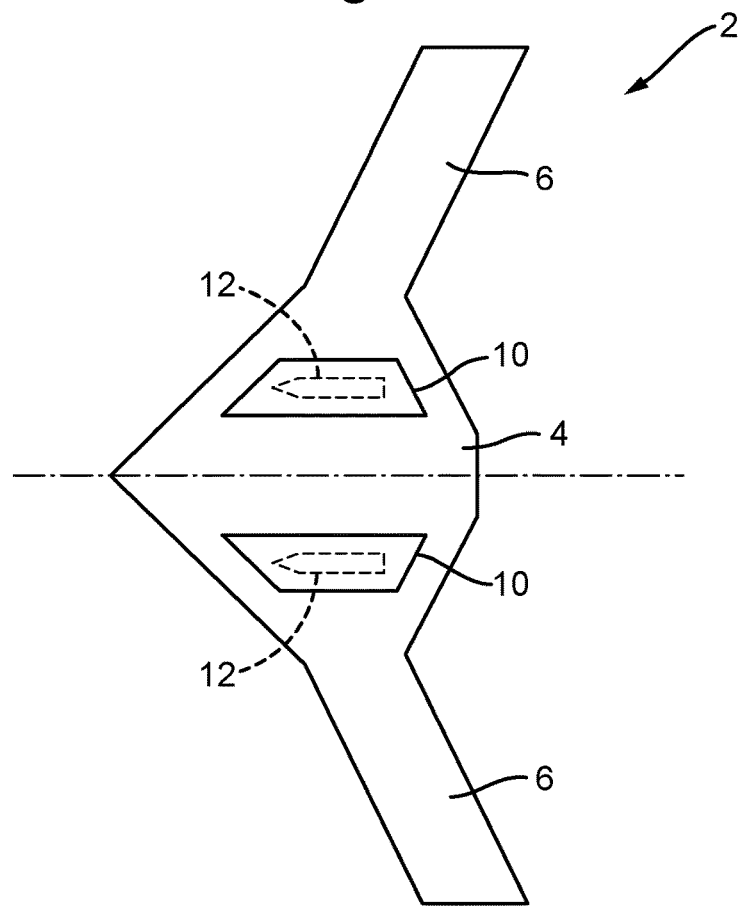
FIG. 1 is a schematic illustration (not to scale) of a bottom view of an example aircraft in which an embodiment of a missile transport system is implemented.

FIG. 1 is a schematic illustration (not to scale) of a bottom view of an example aircraft 2 using which an embodiment of a missile transport system is implemented.

Figure 2:
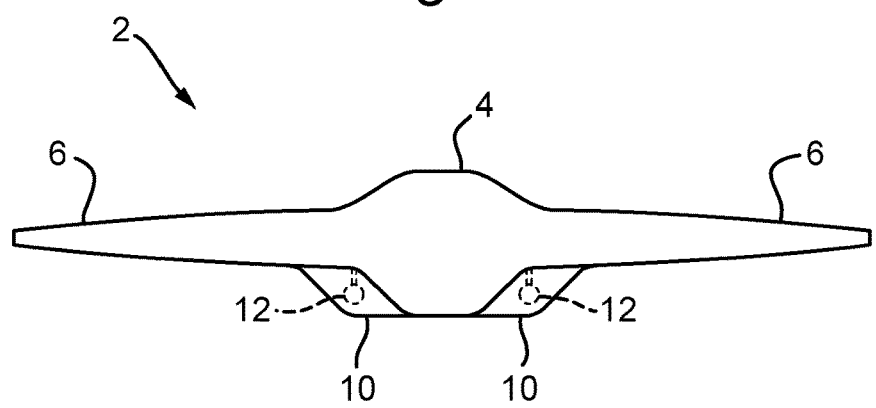
FIG. 2 is a schematic illustration (not to scale) of a front view of the aircraft.

FIG. 2 is a schematic illustration (not to scale) of a front view of the aircraft 2.

Figure 3:
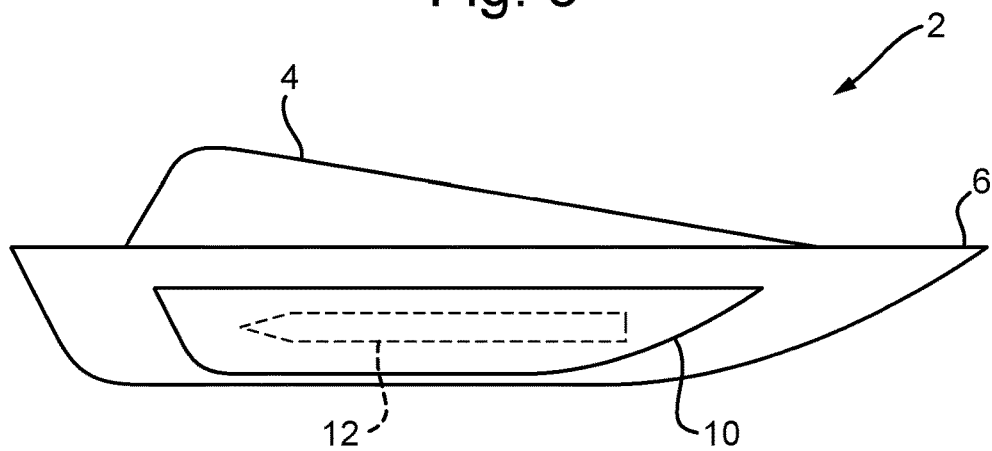
FIG. 3 is a schematic illustration (not to scale) of a side view of the aircraft 2.

FIG. 3 is a schematic illustration (not to scale) of a side view of the aircraft 2.

In this embodiment, the aircraft 2 is a manned aircraft. However, in other embodiments, the aircraft 2 is an unmanned or autonomous aircraft.

In this is embodiment, the aircraft 2 is a "Low Observable" (LO) aircraft, i.e. an aircraft that is relatively difficult to detect using radar systems. In this embodiment, the principle of planform alignment has been used in the design of the shape of the aircraft 2, i.e. there are a relatively small number of different orientations of the surfaces, in particular the curved surfaces that edges, such as leading edges, trailing edges, substantially planar profiles of inlets and outlets and other features that describe a substantially straight linear path on the aircraft, hereinafter referred to as "edges", of the aircraft structure compared to the number of different surface orientations in aircraft that are not Low Observable aircraft. In this embodiment, the leading edges of the aircraft wing are at the same angle as the edges of the trailing surfaces of the aircraft 2. Other structures, such as an air intake bypass doors and a re-fuelling aperture, also use the same angles as the aircraft wing/tail portions. The effect of planform alignment is that only radar radiation (emitted by a radar antenna) that is incident onto the aircraft 2 at a small number of specific angles (i.e. normal to the angles of orientation of the surfaces of the aircraft) is reflected back towards the radar antenna, whereas radar radiation that is incident onto the aircraft 2 at an angle other than one or those specific angles tends to be reflected away from the radar antenna. This is in contrast to aircraft that are not Low Observable aircraft. The edges presented by such non-Low Observable aircraft are dominated by other design principles, such as their aerodynamic characteristics, tend to comprise a broader variety of angles and would typically reflect incident radar radiation in many directions so that that aircraft is detectable at many angles. Thus, the aircraft 2 tends only to be "visible" to radar systems when it is at certain, very specific angles relative to the radar antenna of that system.

In this embodiment, the external surface of the aircraft 2 is made of or is coated in a radar-absorbent material (RAM) such as a foam absorber. The RAM that forms the external skin of the aircraft 2 tends to have relatively low electrical conductivity e.g. compared to the material that forms the aircraft frame.

In this embodiment, the aircraft 2 comprises a fuselage section 4, two wings 6, two missile covers or fairings 10, and two missiles 12.

In this embodiment, the aircraft fuselage 4 is a portion of the aircraft 2 that houses aircraft systems including, but not limited to, an aircraft undercarriage, avionics systems, environmental control systems, and a cockpit.

The aircraft wings 6 are located on opposite sides of the aircraft fuselage 4. In this embodiment, the aircraft wings 6 have a primary purpose of generating lift for the aircraft 2. The aircraft wings 6 have aerofoil shaped cross section. When viewed from below as in FIG. 1, the aircraft wings 6 have substantially uniform thickness such that a leading edge of an aircraft wing 6 has substantially the same orientation as the trailing edge of that aircraft wing 6. This alignment of the leading and trailing edges of each aircraft wing 6 tends to reduce the visibility of the aircraft 2 to radar systems.

In this embodiment, the missile fairings 10 are elongate bowl-shaped covers. Each missile fairing 10 is mounted to a bottom surface of the aircraft 2 an interface of the aircraft fuselage 4 and a respective aircraft wing 6. The missile fairings 10 contact with the underside of the fuselage 4 and an aircraft wing 6. Each missile fairing 10 defines a chamber between the missile fairing 10 and the rest of the aircraft 2 (i.e. between the missile fairing 10 and the fuselage/wing 4, 6).

Attachment of the missile fairings 10 to the rest of the aircraft 2 is described in more detail later below with reference to FIG. 4.

The missile fairings 10 are detachable from the body of the aircraft 2. An example method in which a missile fairing 10 detaches from the rest of the aircraft 2 while the aircraft 2 is in flight is described in more detail later below with reference to FIG. 4.

In this embodiment, an interface between each missile fairing 10 and the fuselage 4 and aircraft wing 6 to which that missile fairing 10 is attached is a "blended" or continuous interface or join. In other words, an outer surface of the aircraft 2 may be contiguous with an outer surface of a missile fairing 10. The configuration of the fairing 10 is, thus, substantially conformal. In some embodiments, a sealant seals at least part of the boundary between the missile fairing 10 and the fuselage/wing 4, 6. Such sealant may be made of a non-electrically conductive material, such as rubber. Preferably, the entirety of the boundary is sealed. Such sealing of the boundary between the missile fairing 10 and the fuselage/wing 4, 6 tends to reduce the visibility of the boundary to radar systems. Thus, the chambers defined between the missile fairings 10 and the fuselage/wing 4, 6 may be sealed or closed.

In this embodiment, the external surfaces of the missile fairings 10 are aerodynamically contoured so as to minimise disruption to the bulk flow of air passing over the external surfaces of the missile fairings 10 in flight and hence minimise aerodynamic drag. The missile fairings 10 are aerodynamically smooth.

In this is embodiment, the shapes of the missile fairings 10 are in accordance with the principle of planform alignment. Each external surface of each missile fairing 10, in particular the edges where the fairing 10 engages with the surface of the aircraft 2, is oriented in the same direction as an external surface (or edge) of the rest of the aircraft 2. In other words, each external surface of each missile fairing 10 is parallel to an external surface of the rest of the aircraft 2. Thus, the missile fairings 10 on the aircraft 2 tend not to significantly increase a radar cross section of the aircraft 2.

The missile fairings 10 may be made of, for example, a carbon fibre composite material. Furthermore, the external surfaces of the missile fairings 10 may be coated in a RAM.

The missiles 12 are mounted to a bottom surface of the aircraft 2. In particular, each missile fairing 10 is attached to the underside of a respective aircraft wing 6 at or proximate to a proximal end of that aircraft wing 6. Each missile 12 is mounted to the aircraft 2 by a respective ejection release unit (ERU). The ERUs are for releasing and projecting the missiles 12 from the aircraft 2.

In this embodiment, each missile fairing or cover 10 is a cover that is fitted over a respective missile 12 such that that missile 12 and any coupling devices (e.g. the ERUs) are wholly covered by the missile fairing 10. Thus, each missile 12 (and associated mounting devices) is wholly contained within a respective chamber defined between a respective missile fairing 10 and the rest of the aircraft 2.

The missile fairings 10 advantageously tend to insulate, and preferably isolate, the missiles 12 and ERUs from incident radar waves. Thus, the radar cross section of the aircraft 2 tends to reduced, for example, compared to if the missile fairings 10 were not present and the missiles 12 were exposed.

Figure 4:
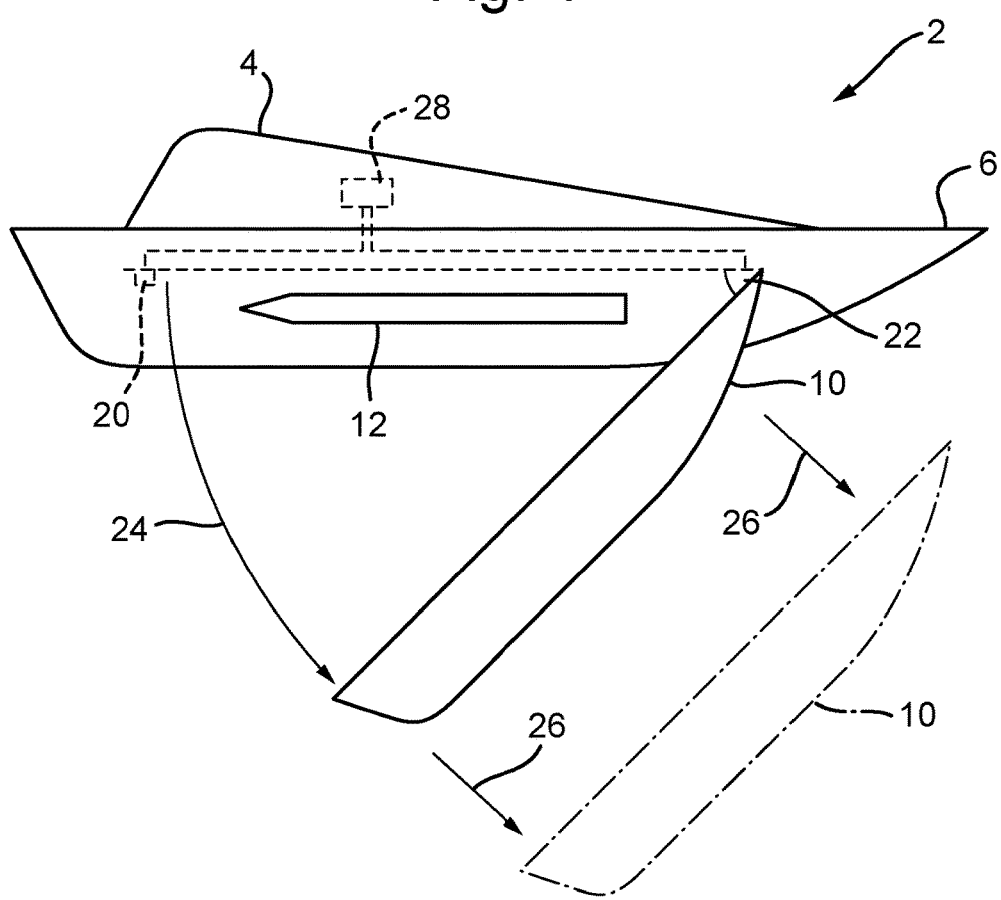
FIG. 4 is a schematic illustration (not to scale) showing detachment of a missile fairing from the aircraft.

FIG. 4 is a schematic illustration (not to scale) showing a side view of the aircraft and illustrates detachment of a missile fairing 10 from the rest of the aircraft 2 while the aircraft 2 is in flight.

In this embodiment, prior to launching the missile 12 from the aircraft 2, while the aircraft 2 is in flight, the missile fairing 10 is ejected from the aircraft 2.

In this embodiment, the missile fairing 10 is coupled to the underside of the aircraft 2 via a cold gas propulsion system 20 and a hinge 22.

The cold gas propulsion system 20 is located inside the chamber defined by the missile fairing 10 at or proximate to a leading edge (i.e. a front end) of the missile fairing 10. The cold gas propulsion system 20 is configured to, in operation, use pressurised cold gas to propel the front end of the missile fairing 10 away from the underside of the aircraft 2, as indicated in FIG. 4 by an arrow and the reference numeral 24. The cold gas propulsion system 20 may be controlled by a missile launch system on-board the aircraft 2, which may be controlled by a pilot of the aircraft 2.

The hinge 22 is located inside the chamber defined by the missile fairing 10 at or proximate to a trailing edge (i.e. a rear end) of the missile fairing 10. The hinge 22 provides a pivot about which the missile fairing 10 rotates when the front end of the missile fairing 10 is propelled from the underside of the aircraft 2 by the cold gas propulsion system 20. The hinge 22 is further configured to release the missile fairing 10 from the rest of the aircraft 2 when the missile fairing 10 is at a predefined angle with respect to the aircraft 2, thereby allowing the missile fairing 10 to move away from the rest of aircraft 2, as indicated in FIG. 4 by arrows and the reference numeral 26.

In some embodiments, the hinge 22 is a frangible hinge that is configured to break or fracture when the missile fairing 10 rotates to or beyond the predefined angle with respect to the aircraft 2, thereby allowing the missile fairing 10 to move away from the aircraft 2 under the effects of gravity.

In some embodiments, the hinge 22 comprises a system that includes a bar and a bar receiving member. The bar may be located on the missile fairing 10 and the bar receiving member may be located on the underside of the fuselage/wing 4, 6. Alternatively, the bar may be located on the underside of the fuselage/wing 4, 6 and the bar receiving member may be located on the missile fairing 10. The bar receiving member may have a C-shaped profile and comprise an opening through which the bar may be moved. The opening of the C-shaped receiving member may be oriented at the predefined angle with respect to the aircraft 2. The missile fairing 10 rotating about the hinge 22 may cause the bar to rotate in the C-shaped bar receiving member until the missile fairing 10 is aligned along the direction of the opening of the bar receiving member (i.e. at the predefined angle with respect to the aircraft). When the missile fairing 10 is aligned along the direction of the opening of the bar receiving member, the bar may move out of the opening of the bar receiving member, and the missile fairing 10 may move away from the aircraft 2 under the effects of gravity.

After the missile fairing 10 is ejected from the aircraft 2, the missile 12 may be launched from the aircraft 2. In some embodiments, a motor of the missile 12 is activated once the missile 12 is remote from the aircraft 2, thereby reducing the risk of damage to the aircraft 2 by the plume of the missile 12.

In this embodiment, the aircraft 2 further comprises a retraction mode 28 that is operatively coupled to the mounting or coupling devices on the aircraft 2 that were used to attach the missile fairing 10 and the missile 12 to the aircraft 2. After the missile fairing 10 has been ejected from the aircraft 2 and the missile 12 has been launched from the aircraft 2, the retraction module 28 retracts the exposed mounting or coupling devices on the aircraft 2 into the fuselage 4 or aircraft wing 6. Preferably, the exposed mounting or coupling devices are retracted into the body of the aircraft 2 so that no coupling device protrudes from the aircraft 2 beyond the external surface of the aircraft skin. For example, ERU yokes, the cold gas propulsion system 20, and the part of the hinge 22 fixed to the aircraft 2 may be retracted, by the retraction module 28, into the fuselage 4 or aircraft wing 6 such that no part of those devices projects from the underside of the aircraft 2 beyond an external surface of the aircraft skin. Retracting the mounting or coupling devices into the aircraft structure advantageously tends to reduce the visibility of those devices to radar systems. Thus, the radar cross section of the aircraft 2 tends to be reduced. Furthermore, retracting the mounting or coupling devices into the aircraft structure advantageously tends to reduce drag on the aircraft 2.

In some embodiments, the retraction module 28 may be further configured to close the openings in the aircraft skin through which the mounting or coupling devices were retracted. For example, in some embodiments, after retraction of the mounting or coupling devices into the body of the aircraft 2, the retraction module 28 fills the openings in the aircraft skin through which the mounting or coupling devices were retracted with a self-expanding foam. The foam may be made of a RAM. Thus, the visibility of the mounting or coupling devices to radar systems tends to be further reduced.

Any other openings in the aircraft external skin may be filled, for example with a RAM foam, in a similar fashion.

Thus, a missile transport system for an aircraft is provided.

For many conventional aircraft, the deployment of a payload from that aircraft typically involves the rapid opening and closing of powered door panels on a lower surface of the aircraft, often at relatively high aircraft speed. Powerful actuators tend to be required to open and close the door panels into the air stream at high aircraft speeds. Furthermore, when a large storage bay on the aircraft is opened at high aircraft speed, the aircraft tends to experience very high acoustic and aerodynamic loads. Furthermore, the opening of door panels while the aircraft is in flight, into the air stream, tends to adversely affect that stability of the aircraft and tends to hinder control of the aircraft.

Advantageously, the above described missile launch system tends to reduce or eliminate use of such door panels. Thus, the powerful actuators used for opening the door panels may be omitted, thereby reducing aircraft weight.

Furthermore, the acoustic and aerodynamic loads experienced by the aircraft when deploying a payload tend to be reduced.

Furthermore, the above described missile launch system tends not destabilise or hinder control of the aircraft. This may be, at least in part, due to the above described missile launch system not including doors or panels that are opening into the air stream.

Advantageously, use of the releasable hinge to mount a missile fairing to the underside of the aircraft tends to provide that separation of the missile fairings from the aircraft occurs in a predictable and repeatable way, thereby minimising a likelihood of damage to the aircraft.

In the above embodiments, there are two missile fairings mounted to the underside of the aircraft. However, in other embodiments, there is a different number of missile fairings. In some embodiments, one or more of the missile fairings is mounted to a different part of the aircraft other than a bottom surface of the aircraft, for example, the top of the aircraft.

In the above embodiments, each aircraft wing has substantially uniform cross section along its length, i.e. from where that wing attached to the aircraft fuselage to the wing tip. However, in other embodiments, one or more aircraft wings has non-uniform cross section along its length. For example, in some embodiments, an aircraft wing may, when viewed from above for example, taper to a point at its tip.

In the above embodiments, a missile is mounted to the aircraft and housed in a missile fairing. However, in other embodiments, a different type of aircraft store or payload is mounted to the aircraft and housed in the missile fairing instead of or in addition to a missile. The terminology "aircraft store" and "payload" is used interchangeably herein to refer to any device or item intended for internal or external carriage and mounted on or in the aircraft. The item may be intended to be separated in flight from the aircraft. Aircraft stores may be expendable, i.e. an aircraft store may be configured to be separated from the aircraft in flight. Examples of expendable stores include, but are not limited to, missiles, rockets, bombs, sonobuoys, or unmanned air vehicles (UAVs). Alternatively, an aircraft store may be non-expendable, i.e. an aircraft store which is not normally separated from the aircraft in flight.

Thus, in some embodiments, the missile fairing may be a cover or fairing for a device or structure other than a missile. A missile cover may be a fairing that is mounted to the aircraft and configured to be detached from the aircraft in flight. The terminology "fairing" is used herein to refer to an external structure added to the aircraft that may increase streamlining of aircraft.

In the above embodiments, all interfaces between each missile fairing and the fuselage/wing is a "blended" or continuous interface or join. However, in other embodiments, one or more interfaces may be discontinuous depending on a desired aerodynamic profile and/or radar cross section profile of the aircraft.

In the above embodiments, the missile fairings are attached to the underside of the aircraft via cold gas propulsion systems and hinges. However, in other embodiments, one or more of the missile fairings is attached to the aircraft in a different appropriate way.

For example, in some embodiments, a plurality of latches are spaced apart from each other on the aircraft, and are configured to attach to the missile fairing around an edge of the missile fairing. These latches may be configured to hold the missile fairing against the underside of the aircraft. When the missile fairing is to be ejected from the aircraft, the latches may disengage from the missile fairing allowing the missile fairing to move away from the aircraft. One or more propulsion systems, e.g. cool gas propulsion systems, may be used to propel the missile fairing away from the aircraft.

In some embodiments, a frangible adhesive may be used to fix the missile fairing to the aircraft. One or more propulsion systems, e.g. cool gas propulsion systems, may be used to break the adhesive bond between the missile fairing and the aircraft skin, and propel the missile fairing away from the aircraft.

In the above embodiments, the missile fairings are made of a carbon fibre composite material coated in a RAM. However, in other embodiments, one or more of the missile fairings are made of a different appropriate material. In some embodiments, a missile fairing may be made of a degradable (e.g. biodegradable) material. In some embodiments, a missile fairing may be made of a material that dissolves in a liquid (for example, when exposed to rainwater, or if the missile fairing lands in water such as a sea or river). In some embodiments, the missile fairing may include a "self-destruct" device, such as an explosive, that is configured to destroy or fragment the missile fairing after it has been ejected from the aircraft. Use of degradable materials, dissolvable material, self-destruct devices, and the like advantageously tends to reduce the likelihood of an ejected missile fairing being retrieved and analysed by unfriendly parties.

What is claimed is:

1. A system comprising:
   a low observable aircraft having its edges oriented at a limited number of directions designed in accordance with planform alignment;
   a device mounted to the aircraft outside external surfaces of the aircraft; and
   a fairing located outside the external surfaces of the aircraft, the fairing being releasably coupled to the one or more external surfaces of the aircraft, at least part of the fairing being spaced apart from one or more of the external surfaces of the aircraft so as to define a chamber between the fairing and the one or more external surfaces of the aircraft; wherein
   the device is wholly located within the chamber; and
   the fairing is configured such that one or more interfaces between the fairing and the aircraft are substantially conformal and are oriented in the same direction as at least one edge of the aircraft in accordance with the principals of planform alignment.

2. The system according to claim 1, wherein the chamber is a closed chamber.

3. The system according to claim 1, the system further comprising a sealant located at an interface between the fairing (10) and one or more external surfaces of the aircraft (2), the sealant being non-electrically conductive.

4. The system according to claim 1, the system further comprising a fairing (10) detachment system operable to detach the fairing (10) from the aircraft (2).

5. The system according to claim 4, wherein the fairing (10) detachment system comprises a hinge (22) between the fairing (10) and the aircraft (2), the hinge (22) being configured to permit rotation of the fairing (10) with respect to the aircraft (2), and to permit free movement of the fairing (10) away from the aircraft (2) when the fairing (10) is at a predefined angle with respect to the aircraft (2).

6. The system according to claim 1, the system further comprising a propulsion system (20) configured to propel the fairing (10) away from the aircraft (2).

7. The system according to claim 6, wherein the propulsion system (20) is a cold gas propulsion system (20).

8. The system according to claim 1, wherein the aircraft (2) comprises:
- a fairing retaining device for retaining the fairing (10) against one or more external surfaces of the aircraft (2); and
- a first retraction device (28) configured to, after release of the fairing (10) from the aircraft (2), retract the fairing retaining device into the aircraft (2) such that the fairing retaining device is within the external surfaces of the aircraft (2).

9. The system according to claim 8, wherein the aircraft (2) further comprises means for sealing an opening through which the fairing retaining device is retracted into the aircraft (2).

10. The system according to claim 1, wherein the aircraft (2) comprises:
- a mounting device for releasably mounting the device (12) to the aircraft (2) and operable to detach the device (12) from the aircraft (2); and
- a second retraction device (28) configured to, after release of the device (12) from the aircraft (2), retract the mounting device into the aircraft (2) such that the mounting device is within the external surfaces of the aircraft (2).

11. The system according to claim 10, wherein the aircraft (2) further comprises means for sealing an opening through which the mounting device is retracted into the aircraft (2).

12. The system according claim 1, wherein the fairing (10) comprises means for fragmenting or destroying the fairing (10) after separation of the fairing (10) from the aircraft (2).

13. The system according to claim 1, wherein the fairing (10) is at least partially made of a material selected from a group of materials consisting of: a radar absorbent material, a degradable material, a biodegradable material, and a material that is dissolvable in water.

14. A method of providing a system, the method comprising:
- providing a low observable aircraft having its edges oriented at a limited number of directions designed in accordance with planform alignment;
- mounting a device to the aircraft outside external surfaces of the aircraft; and
- releasably coupling a fairing to the aircraft outside the external surfaces of the aircraft such that:
- at least part of the fairing is spaced apart from one or more of the external surfaces of the aircraft so as to define a chamber between the fairing and the one or more external surfaces of the aircraft;
- the device is wholly located within the chamber; and
- the fairing is configured such that one or more interfaces between the fairing and the aircraft are substantially conformal and are oriented in the same direction as at least one edge of the aircraft in accordance with the principals of planform alignment.

* * * * *